United States Patent [19]
Houseman

[11] 3,971,847
[45] July 27, 1976

[54] HYDROGEN-RICH GAS GENERATOR

[75] Inventor: John Houseman, Pasadena, Calif.

[73] Assignee: The United States of America as represented by the Adminstrator of the National Aeronautics and Space Administration, Washington, D.C.

[22] Filed: Feb. 27, 1975

[21] Appl. No.: 553,687

Related U.S. Application Data

[62] Division of Ser. No. 428,444, Dec. 26, 1973, Pat. No. 3,920,416.

[52] U.S. Cl. .............................. 423/650; 48/197 R; 48/215; 252/373; 431/4; 431/163; 431/210
[51] Int. Cl.² .......................................... C01B 1/13
[58] Field of Search ................. 48/215, 197 R, 212, 48/213; 423/650; 23/281; 252/373; 431/4, 163, 210

[56] References Cited
UNITED STATES PATENTS

| | | | |
|---|---|---|---|
| 2,051,363 | 8/1936 | Beekley | 423/650 |
| 2,793,938 | 5/1957 | Frank | 48/215 |
| 3,682,142 | 8/1972 | Newkirk | 123/3 |

Primary Examiner—S. Leon Bashore
Assistant Examiner—George C. Yeung
Attorney, Agent, or Firm—Monte F. Mott; Wilfred Grifka; John R Manning

[57] ABSTRACT

A process and apparatus is described for producing a hydrogen rich gas by introducing a liquid hydrocarbon fuel in the form of a spray into a partial oxidation region and mixing with a mixture of steam and air that is preheated by indirect heat exchange with the formed hydrogen rich gas, igniting the hydrocarbon fuel spray mixed with the preheated mixture of steam and air within the partial oxidation region to form a hydrogen rich gas. The apparatus for performing the process is in the form of a bell-shaped chamber which consists of an open cylinder wherein a partial oxidation reaction takes place. An air pasageway and a pipe for injecting water into the passageway are provided for forming a steam-air mixture. The air is preheated indirectly by the heat generated as a result of igniting a hydrocarbon fuel spray and thus the water is converted into steam when injected into the preheated air. The air-steam mixture is then conducted through a region of the hydrogen generator where a plurality of pipes are spaced and arranged to provide a heat exchange baffle. These pipes conduct the hydrogen rich gas after it has been generated in the open cylinder.

1 Claim, 6 Drawing Figures

HYDROGEN-RICH GAS GENERATOR

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

This is a division of application Ser. No. 428,444, filed Dec. 26, 1973, now U.S. Pat. No. 3,920,416.

BACKGROUND OF THE INVENTION

1. Field of the Invention

This invention relates to generators of hydrogen rich gas and more particularly to improvements therein.

2. Description of the Prior Art

In an application for patent by Houseman, et al, Ser. No. 390,049, filed Aug. 20, 1973, and assigned to a common assignee, there is described and claimed a hydrogen rich gas generator comprising a chamber wherein air and hydrocarbon fuel are injected into one end of the chamber wherein they are mixed and then ignited to provide very hot combustion gases, by partial oxidation. These gases move away from the ignition region to another region in the chamber where water is injected to be turned into steam by the hot combustion gases. Either simultaneously with the injection of water or subsequently thereto, more hydrocarbon fuel is injected. The steam which is formed mixes with the hot gases present and a steam reforming reaction with the hydrocarbon fuel takes place to produce a hydrogen rich gas.

While the described arrangement does provide hydrogen rich gases, it also has a tendency to form carbon. Since one of the purposes of the hydrogen generator is to provide hydrogen gas to be used in an internal combustion engine, the presence of the carbon which is generated is undesirable since it tends to clog up the induction system of the internal combustion engine.

It was also found that the yield of the hydrogen rich gas that was obtained was not as large as was to be expected because of heat losses from the generator due to the distances between injection points, before the steam reforming reaction occurs.

OBJECTS AND SUMMARY OF THE INVENTION

An object of this invention is the provision of a novel method and means for minimizing the carbon output of a hydrogen rich generator of the type described.

Still another object of this invention is the provision of a novel method and means for increasing the hydrogen content output of a hydrogen rich gas generator of the type described.

The foregoing and other objects of the invention may be achieved by preheating the input air, then injecting atomized water into the preheated air stream and after some more preheating, the resulting steam-air mixture is introduced into the flame zone. An alternate method is to atomize the water and introduce it directly into the flame zone.

Yet another method is to introduce the water directly into the primary flame zone as an emulsion of water and hydrocarbon fuel.

As a result of introducing all ingredients required into the flame zone and no place else, carbon formation is eliminated as well as the necessity for using a secondary hydrocarbon injection since all the hydrocarbon required is being entered into the generator through the primary fuel nozzle.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
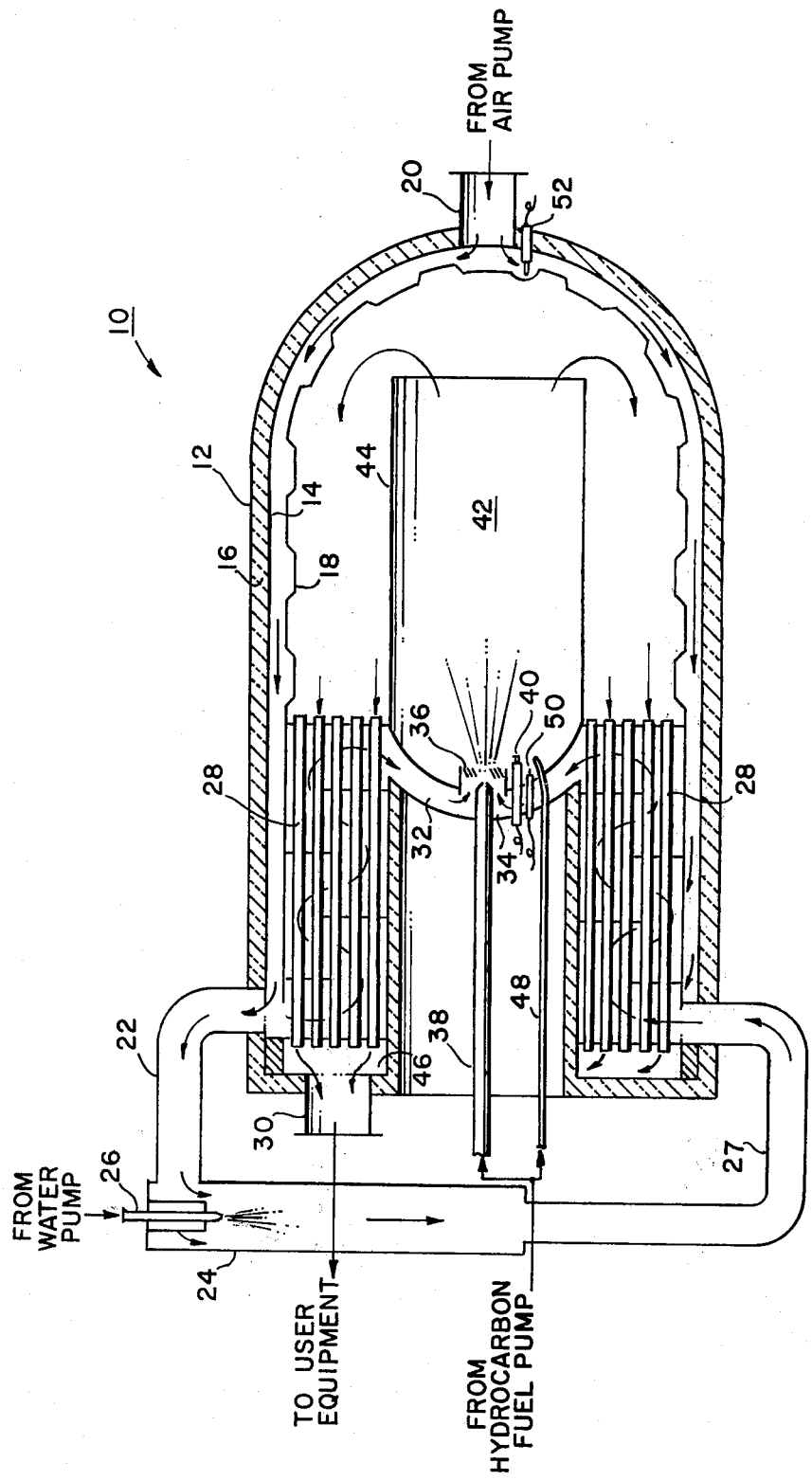
FIG. 1 shows an embodiment of the invention, in section, wherein steam is generated external to the generator.

Referring now to FIG. 1, there may be seen a view in cross-section of an improved hydrogen generator in accordance with this invention. This comprises a bell-shaped chamber 10 having an outer wall 12, and an inner wall 14, spaced therefrom, with thermal insulation 16 therebetween. Spaced from the inner wall 14, is yet another wall 18, which forms an air passage with the inner wall 14.

Air from a pump or compressor, not shown, is introduced into the air passage by means of an induction pipe 20. The inner wall 18 surrounds the hot region of the hydrogen generator and therefore, the air flowing through the passageway is preheated. The preheated air flows into a pipe 22, which joins with a chamber 24, into which a water spray is introduced by means of a spray nozzle 26, which is connected to a water pump, not shown.

The water spray is converted into steam in the chamber 24. Chamber 24 conducts the steam and air mixture, through a pipe 27, back into a region of the hydrogen generator where a plurality of pipes 28, are spaced and arranged to provide a heat exchange baffle. These pipes 28 conduct the hydrogen rich gas, after it has been generated, to an output chamber 46 from which the gas is sent to user equipment through a pipe 30, to which the user equipment, such as an internal combustion engine is connected.

The steam and air mixture circulates through the pipe baffle, being still further heated thereby, and serves to cool down the hydrogen rich gas which passes through the pipes. The air-steam mixture is then conducted from the pipe baffle arrangement by means of passageways 32, 34, through a set of vortex baffles 36, into a region of the reactor in which partial oxidation of the hydrocarbon fuel, which is also introduced into this region, takes place. Simultaneously with the partial oxidation reaction, steam reforming takes place.

It should be noted that what is introduced into the partial oxidation region through the vortex baffles is a mixture of air and steam which are formed into a vortex by the pressence of these baffles 36.

A tube 38, has one end connected to a hydrocarbon fuel pump, not shown, and the other end introduces liquid hydrocarbon fuel in the form of a spray into the partial oxidation region. Because of the vortex created by the air-vortex baffles, an excellent mixing of the steam-air mixture and fuel takes place. The mixture is ignited by a hot wire, or spark igniter 40. The relative quantities of air, fuel and water are such that partial oxidation and steam reforming of the hydrocarbon takes place simultaneously while carbon formation is avoided. By way of illustration, and not as a limitation on the invention, hydrocarbon fuel was supplied at a rate on the order of 2 gallons/hour. Air was supplied under a pressure of between 2 to 5 psi. A water to fuel ratio of between 0.5 and 1.2 was employed.

The presence of steam aids considerably in suppressing carbon formation. Combustion takes place under fuel rich conditions, with steam dilution, with accompanying low flame temperature, so that very little nitric oxide is produced. In view of the manner of introduction of the fuel and air-steam mixture, a vortex-type flame is provided with a high degree of turbulence, which aids in thoroughly mixing the air, the steam and the fuel and which promotes flame stabilization.

The partial oxidation reaction is virtually completed within the space 42, established by the open cylinder 44, which is supported adjacent the region where the fuel and steam are introduced. However, steam reforming, takes place within the partial oxidation region 42, and also in the annular space defined between the walls 18 and the cylindrical walls 44. The annular space between the walls 18 and the cylinder walls 44, also serves to thermally insulate the space 42 confined within the cylinder 44 so that a high reaction temperature within the cylinder is maintained.

The walls 18 are heated up because of the reaction which takes place adjacent thereto and thus, the air passing on the opposite sides of these walls is preheated. The hot product gases resulting from the reaction flows through the tubes 28 where they are partially cooled, since the tubes constitute a heat exchanger whereby the incoming air-steam mixture can take on the heat of the hot product gas. The tubes terminate in an output annular space 46 which is in turn connected to the discharge pipe 30.

Product gas will still be superheated with respect to water upon leaving the reactor. If it is desired, the product gas may be further cooled down to condense out the water which can be recirculated back to the water feed tank.

In order to start up the hydrogen generator, a small diameter tube 48 has one end connected to the hydrocarbon fuel pump and the other end terminates in a nozzle which is adjacent to the hot wire 40, which also has a small wire mesh wick surrounding it (not shown). A small amount of fuel is deposited on this wire mesh wick when it is desired to start the hydrogen generator. This is then ignited by the hot wire. A temperature sensor 50, which may be any of the well known temperature sensing devices, such as a thermistor, or a bimetallic device, indicates when a high enough temperature is reached. The signal generated as a result is used to enable a supply of hydrocarbon fuel from the main supply, which flows through pipe 38. Hydrocarbon fuel sprayed from pipe 38 is ignited by the pilot flame at the wick surrounding the hot wire 40.

Another temperature sensor, 52, which is located in the walls at the opposite end of the container, senses when the main flame, due to the burning of the hydrocarbon supplied through the nozzle of pipe 38, has heated up the combustion chamber walls to a sufficient degree so that the air temperature at the sensor 52 reaches a predetermined value. At this predetermined value, the sensor output signal is utilized to enable the water nozzle 26, to supply water to bring about steam formation.

Figure 6:
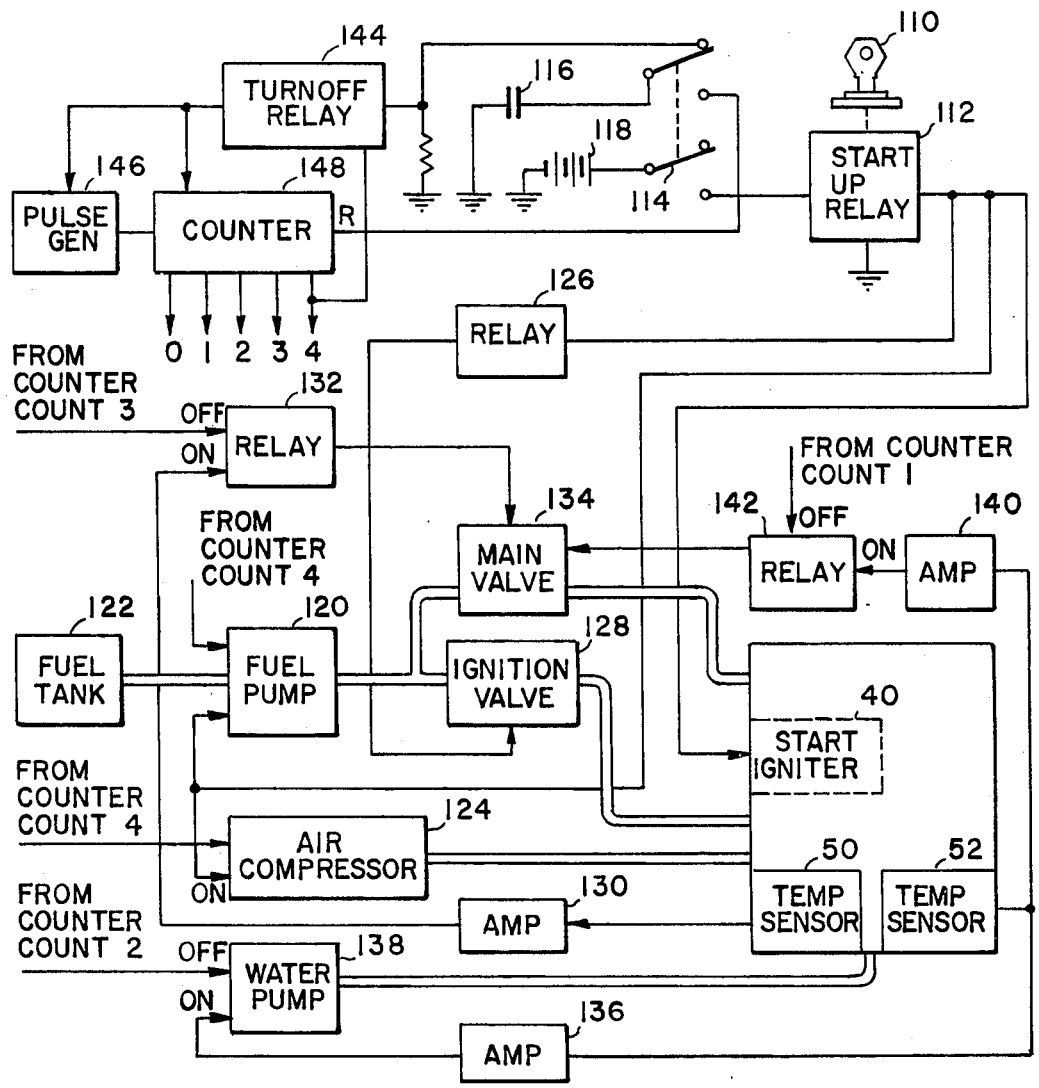
FIG. 6 is a schematic arrangement illustrating the start up and turn off sequences of the generator.

The turn on sequence described, enables rapid heat-up of the equipment and enables attaining an air preheat temperature that is high enough to prevent liquid water accumulation in the heat exchanger during start-up. In addition, the reactor wall surface 44 is thoroughly heated up, thereby avoiding soot formation. When it is desired to shut down, the flow of hydrocarbon fuel through the pipe 38 is reduced for a few seconds to enable a hot stream of steam containing gas to continue to flow through the whole reactor to promote gasification of any tars or soot that may be deposited. Then, the water pump is turned off to enable air-rich hot combustion gases to sweep through the whole unit for a few seconds to insure combustion of any deposits of tar or soot with the available excess oxygen. Thereafter, the fuel pump and the air compressor are turned off. A control arrangement for sequencing turn on and turn off which may be used with this invention is shown in FIG. 6 herein. By injecting all the ingredients required for making hydrogen rich gas into a single region, instead of at spaced locations along the chambers, as was done heretofore, heat losses are avoided, hydrogen rich gas yield is increased and unwanted carbon is minimized.

Figure 2:
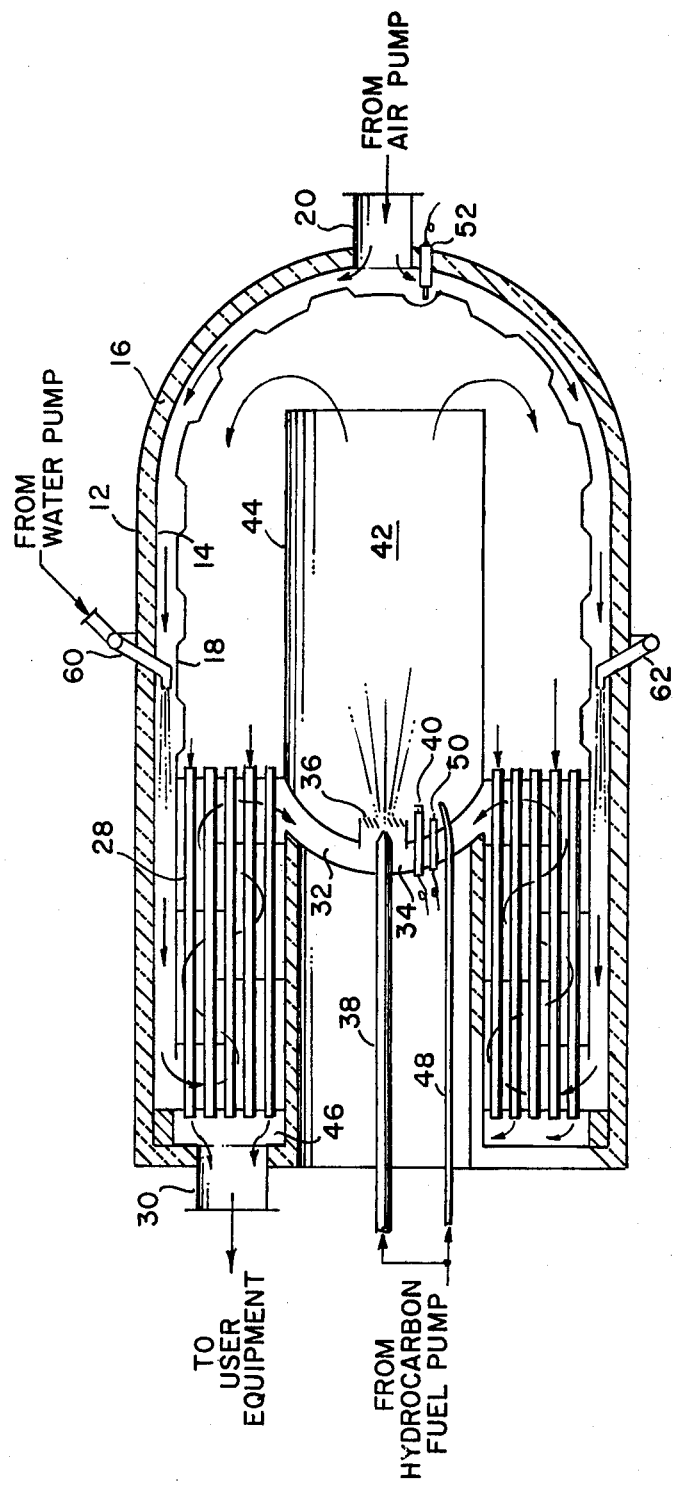
FIG. 2 is a cross-sectional view of the embodiment of the invention illustrating how steam can be generated within the generator.

FIG. 2 is a cross-sectional view of an arrangement of the invention wherein the steam generation process takes place within the generator. Similar functioning parts to those shown in FIG. 1 bear the same reference numerals. Here, a pair of nozzles, respectively 60, 62, introduce a water spray, from the water pump, into the passageway which is established between the wall 18 and the wall 14 at a location sufficiently downstream from the location at which air is introduced to enable the air to heat up. The heated air converts the spray droplets into steam, and the steam is conducted through the baffle established by the pipes 28, whereby the steam-air mixture is further heated by the hot product gases which pass through these pipes to the annular space 46.

The operation of the hydrogen rich gas generator is the same as has been described for FIG. 1, except that, steam is now generated within the generator, whereas in FIG. 1 it was generated external to the generator. This is a preferred arrangement.

Figure 3:
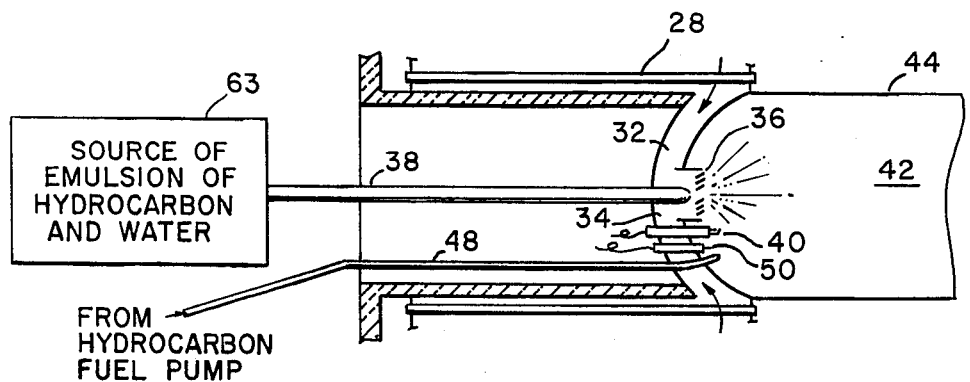
FIG. 3 is a view in section illustrating another embodiment of the invention.

FIG. 3 is a sectional view of the hydrogen generator, only showing so much of the generator as differs from the arrangement previously described in FIGS. 1 and 2. In this embodiment of the invention, an emulsion of hydrocarbon and water is made by an emulsifying agent with water and hydrocarbon fuel. Thus, a source of the emulsion of hydrocarbon and water 62 is provided. This is supplied through the pipe 38 in place of the hydrocarbon fuel. Air is preheated in the passageway formed in the chamber walls and is passed through the baffle region and then through passageways 32, 34, into the combustion region. The water in the emulsion is turned into steam by the hot gases created by the ignition of the hydrocarbon fuel in the region adjacent the vortex baffles 36. The steam reformation of the unburned hydrocarbon fuel then takes place in the manner previously described.

By way of example, and not by way of limitation, a suitable emulsifying agent is polyethylene (4) Laurel Ester, made by Atlas-ICI and distributed by McKesson Chemical Company of Los Angeles. This is mixed in the proportion of 1/2 to 1% by weight of water and after thoroughly mixing is mixed with an equal volume of fuel.

Figure 4:
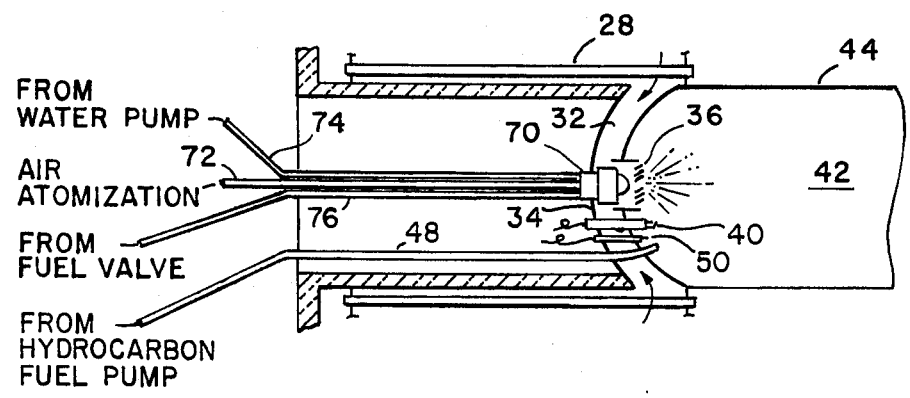
FIG. 4 is a view in section illustrating still another embodiment of the invention.

FIG. 4 is a view of a section of the hydrogen generator which shows still another arrangement. Here, a pneumatic atomizer 70 is used to mix the water and the fuel and inject it as spray droplets into the oxidation region. A suitable arrangement for performing the atomization is to mix the fuel and water, using a T-shaped arrangement of pipes which water under pressure enters one branch and the fuel under pressure enters the opposing branch to mix with water at the junction of the pipes. The mixture is then fed into the usual pneumatic atomizer. Preheated air is injected through the vortex deflectors 36 into the combustion region. The fuel is ignited by the hot wire 40, and the atomized water droplets injected therewith are immediately converted into steam by the hot gases which are created. The steam reformation then takes place in the manner described previously.

The pneumatic atomizer 70, is supplied by air under pressure from a source, not shown. This air under pressure is supplied to the atomizer from the source by means of a tube 72. A second tube 74, is used to conduct water from the water pump to the pneumatic atomizer. A third tube 76, is used to conduct hydrocarbon fuel from the hydrocarbon fuel pump to the atomizer 70.

Figure 5:
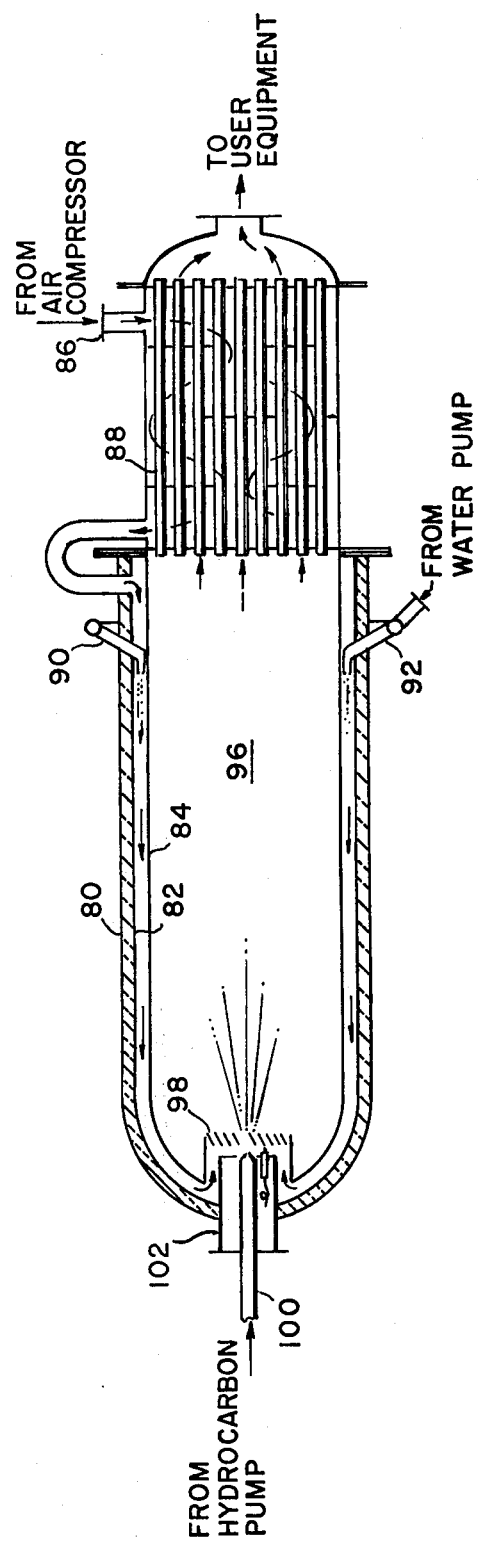
FIG. 5 is a view in section illustrating another arrangement for the invention.

FIG. 5 is a cross-sectional view of an embodiment of the invention using a somewhat different physical arrangement than that shown in the preceding drawings. However, the principles of operation are identical. Here, a somewhat cylindrical shaped gas generator is employed. The gas generator has two spaced walls, respectively 80, 82, between which thermal insulation is placed. A third inner wall 84, is spaced from the wall 82, to establish a passageway. Air from a compressor is introduced into an intake pipe flange 86. It flows over the baffle created by the plurality of spaced tubes 88. The air that passes through the baffle is heated and is then led into the passageway between walls 84 and 86. Water spray is introduced into the passageway using spray nozzles 90, 92, which is supplied with water by a water pump (not shown). The hot air which has passed through the baffle, causes the water drops to become steam. The steam and hot air mixture are directed by the space between the walls 82 and 84 into the main chamber 96 of the generator through the vortex baffles 98.

Fuel from the hydrocarbon fuel pump is introduced into the vortex region of the generator by means of a pipe 100, which has a spray nozzle tip positioned adjacent the vortex baffles 98. The procedures for starting up the hydrogen rich gas generator and for turning it off are the same as were described in connection with FIG. 1.

FIG. 5 should be considered as exemplary of the type of a cylindrically shaped gas generator in which the baffle is placed at the end opposite to the combustion region. The cylindrical walls within the generator defining the combustion region are omitted. Steam is internally generated in the manner shown in FIG. 2. An emulsion of hydrocarbon and water may be injected as shown in FIG. 3, if desired, or water and fuel may be simultaneously injected as shown in FIG. 4, through the intake flange 102 which includes the ignitor and the pipe leading from the hydrocarbon fuel pump.

FIG. 6 is a schematic drawing of a control arrangement for the hydrogen generator shown in the drawings. Upon turning a start-up key 110, which can be the ignition key for a vehicle, a double pole double throw switch 114, (shown in the open position), is operated. This energizes a start-up relay 112, and charges a capacitor 116 from a power source 118. The energized start-up relay enables current to flow to activate the hot wire igniter 40, and also enables the start-up of a fuel pump 120, which draws fuel from a tank 122. Also, enabled to be started at this time is an air compressor 124. The start-up relay 112 also enables a relay 126 to be operated. This relay energizes an ignition fuel valve 128 for a short time whereby a small quantity of hydrocarbon fuel is applied to the wick surrounding the hot wire igniter 40.

The temperature sensor 50 provides an output signal when it senses that a flame is present, which output signal is amplified by an amplifier 130. The output of amplifier 130 energizes a relay 132, which enables the main hydrocarbon fuel solenoid valve 134 to be opened to supply fuel at a low rate. This main fuel spray is ignited by the pilot flame of the wick surrounding the hot wire 40.

Thereafter, when temperature sensor 52 senses that the main flame has heated up the chamber walls to a sufficient degree, its output is applied to an amplifier 136, whose output enables a water pump 138 to be turned on. This brings about steam formation. Another amplifier 140, also amplifies the output of the temperature sensor 52 and turns a relay 142 on. Relay 142 after a short delay enables main valve 134 to be turned to its full on position which supplies hydrocarbon fuel to the reformer at a high rate.

When it is desired to shut down, the start-up sequence is essentially repeated in reverse. When the ignition key 110 is turned off, the dobule pole double throw switch 114 is operated to the open position shown. Capacitor 114 enables a turn off relay 144 to be operated over as long an interval as is required for turn off. This relay enables a pulse generator 146 to start generating pulses. These pulses are applied to a counter 148, which in response, commences to count up. On the occurrence of the first count, relay 142 is enabled to be de-energized and the main valve 134 returns to its low fuel supply rate position. A hot stream of gas will still flow through the whole reactor to promote gassification of any tars or soot that may be deposited.

On the second count, the water pump 138 is turned off. On the third count, the relay 132 is deactivated whereupon the main fuel valve 134 is completely turned off.

Upon the fourth count, the fuel pump 120 is turned off, as well as the air compressor 124. Relay 144 is also turned off resulting in the pulse generator 146 being turned off. It should be noted that upon a new actuation of the ignition start key, the counter 148 is reset.

The circuit arrangement shown in FIG. 6 can be used without any modifications to control start-up and turn off for the generators shown in FIGS. 1, 2, 4, and 5. For the arrangement shown in FIG. 3, the fuel tank 122 will actually be a reservoir of an emulsion of hydrocarbon and water and water pump 138 and amplifier 136 may be dispensed with.

There has accordingly been described and shown herein a novel method and means for generating a hydrogen rich gas using the steam reforming process.

This method avoids the formation of carbon by providing for a high steam concentration in the primary flame zone. The effect of the injection of steam or water into the primary flame zone also lowers the primary flame temperature which prevents the pyrolysis of fuel leading to soot formation.

With this arrangement of the invention, by passing both the steam and the hydrocarbon through the primary flame zone, the reactants pass through the highest temperature zone which leads to a high reaction rate for steam reforming. As a result, there is a drastic reduction in soot formation as well as an increase in hydrogen yield. Finally, the structure of the reactor is considerably simplified.

I claim:

1. A method of generating a hydrogen rich gas in a hydrogen generator having a partial oxidation region comprising
   introducing a liquid hydrocarbon fuel in the form of a spray into said partial oxidation region,
   preheating air with the heat generated as a result of igniting the hydrocarbon fuel spray, injecting water into said preheated air to form a mixture of steam and air, further heating indirectly said mixture of steam and air,
   mixing said further heated steam and air with said hydrocarbon fuel spray within said partial oxidation region,
   igniting said hydrocarbon fuel spray mixed with said steam and air within said partial oxidation region to form a hydrogen rich gas, and
   removing all of said hydrogen rich gas from said partial oxidation region.

* * * * *